Feb. 18, 1969     W. C. RIESTER     3,427,676
WINDSHIELD WIPER ARM
Filed Jan. 12, 1968
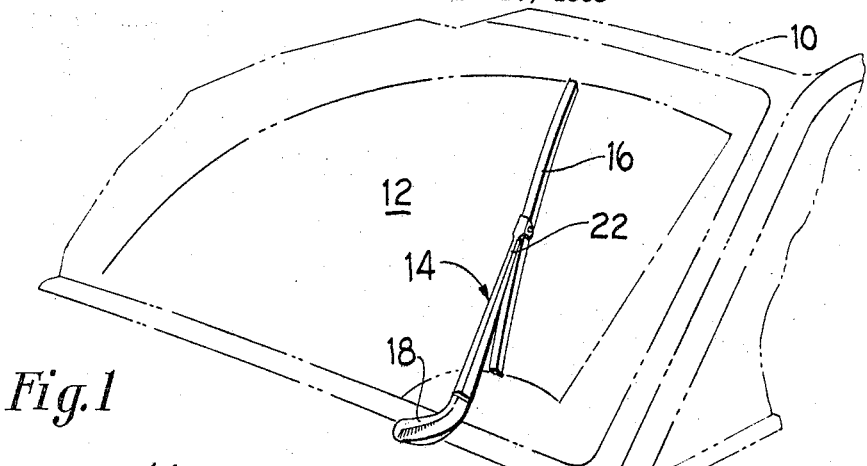
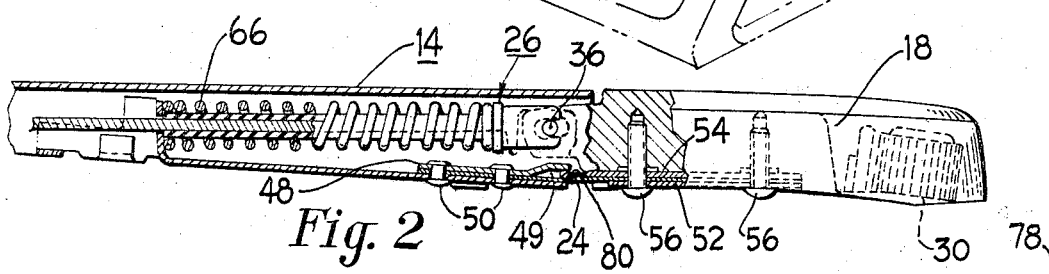
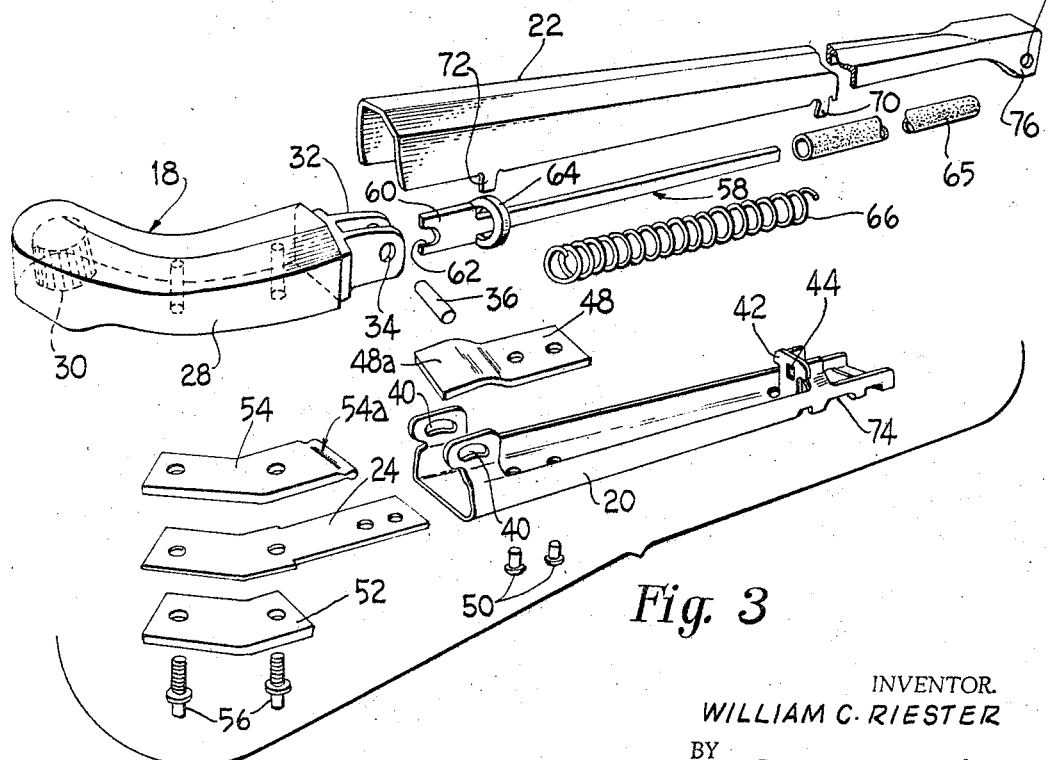
INVENTOR.
WILLIAM C. RIESTER
BY
E. Herbert Liss
ATTORNEY.

United States Patent Office 3,427,676
Patented Feb. 18, 1969

3,427,676
WINDSHIELD WIPER ARM
William C. Riester, Williamsville, N.Y., assignor to Trico Products Corporation, Buffalo, N.Y.
Filed Jan. 12, 1968, Ser. No. 697,489
U.S. Cl. 15—250.35                    8 Claims
Int. Cl. B60s 1/34

ABSTRACT OF THE DISCLOSURE

A windshield wiper arm spring retaining frame is hingedly secured by a flat strip of flexible material to the mounting head. A stabilizer plate spanning the hinge area for providing torsional rigidity is fastened to the mounting head at one end and its rounded edge is clamped to the spring retainer at its other end, but rotatable therein. A compression spring assembly for applying pressure to a wiper blade acts between an upstanding spring seat at one end and a transverse pin carried by the mounting head at its other end. The ends of the transverse pin ride in arcuate slots formed in upstanding ears on the spring retainer acting as stop means to prevent excessive pivotal movement at the hinge point.

Background of the invention

The present invention relates to windshield wiper arms for motor vehicles. Arms conventionally employed on present day automobiles comprise a mounting head section and an outer arm blade carrying section pivotally secured together on a transverse axis. They utilize a tension spring for providing biasing pressure to cause the blade to conform to the contoured glass. The pivotal axis comprises a pin journaled in a bearing. The tension spring is mounted at one end to the mounting head and at its other end it is secured by suitable means to the outer arm section at a substantial distance outwardly of the mounting head. Because of the longer, heavier arms and blades utilized for the large windshields of modern automobiles, both the gauge and the circumference of the helical springs employed have become greatly increased. The relatively longer arms and blades require large size pivot pins and bearings to withstand the greater stresses applied. The larger springs must be housed within a large, box-like spring retainer which materially affects the driver's view as well as the appearance characteristics of the automobile.

Modern automobiles from year to year incorporate dramatic changes in styling and body design. The trend is toward concealing as much of the accessory equipment as possible as, for example, windshield wiper arms and blades. The windshield wiper arms can be concealed either by blending them into the contour of the molding strip at the lower edge of the windshield or by concealing the arms and blades. Concealment requires that the arm pass through a small opening. If either blending or concealing is desired, a low profile arm is required. Blended arms must present a smooth, uninterrupted surface having no rivet or screw heads showing on the visible surfaces. The increasing length of the arms and blades with conventional construction render it difficult to maintain a low profile.

Summary

The above-mentioned problems resulting from design considerations and functional requirements are overcome by the unique wiper arm construction of this invention.

Briefly, the invention comprises a wiper arm assembly which includes a mounting head hingedly secured to a spring retaining frame by a flexible hinge. Preferably, a substantially flat, flexible hinge is employed which eliminates the large pivot pin and bearing, thereby effecting reduction of the width and height of the blade at the pivotal connection. The flexible hinge provides a pivotal joint with minimum friction because only internal friction resulting from flexing of the hinge is present. There is no friction build-up due to wear, weathering and foreign deposits as occurs in the pin type hinge. Stop means are provided to prevent excessive pivotal movement about the flexible hinge. Stabilizing means overlying the hinge are provided to resist torsional forces. A compression spring assembly comprising a spring guide and a compression spring spans the hinge line and is operatively seated at one end at the mounting head and at its other end to an upstanding spring seat on the spring retainer frame. A blade retaining arm extension is secured to and covers the spring retainer frame, concealing all protrusions and interruptions to thereby present an arm having smooth, uninterrupted visible surfaces. With this construction exposed rivet heads on the side of the arm are eliminated.

The principal object of the present invention is to provide an improved low profile wiper arm assembly which eliminates the need for a relatively large pivot pin and bearing to thereby reduce the height and width of the wiper arm in the pivot area.

Another object of the invention is to provide an improved low profile wiper arm assembly which presents smooth uninterrupted visible surfaces concealing rivet heads, screw heads and other protrusions and interruptions.

Other objects and advantages of the invention will be apparent from the following detailed description taken in connection with the accompanying drawings.

Brief description of the drawings

FIG. 1 is a fragmentary perspective view of the motor vehicle embodying the invention;

FIG. 2 is a fragmentary view in longitudinal cross section; and

FIG. 3 is an exploded perspective view.

Description of the preferred embodiment

In FIG. 1 there is shown a fragment of a motor vehicle 10 having a windshield 12. A windshield wiper arm 14 is drivingly secured to a pivot shaft (not shown) mounted on the cowl of a vehicle and carries a wiper blade 16 at its free end. The arm 14 includes a mounting head 18 hingedly secured to a spring retainer frame 20. An outer arm blade carrying extension 22 is secured to and conceals the retainer frame 20. (See FIGS. 2 and 3.) A flexible hinge 24 connects the mounting head section 18 to the spring retainer frame 20 at the lower surface of the arm. Preferably, the flexible hinge is formed from flat leaf spring stock, but it will be understood of course that other suitable material may be employed. A compression spring assembly 26 acting between the mounting head section 18 and the retainer frame 20 serves as biasing means about the hinge 24 to provide wiping pressure. Because the hinge line is at the lower surface rather than intermediate the upper and lower surface where the pivot pin is journaled in prior art arms, the lever arm length between the applied spring force and the pivot is increased. This permits the use of a lighter spring having a relatively smaller diameter.

The mounting head 18 includes a body portion 28 having adjacent one end thereof an internally serrated cavity 30 for securing the arm to an externally serrated pivot shaft drive burr (not shown). Projecting outwardly from the other end are a pair of ears 32 having aligned openings 34 which receive a transverse pin 36. The spring retainer frame 20 is U-shaped in cross section and includes a pair of upstanding ears 38 at its inner end. The upstanding ears 38 have aligned arcuate openings 40 which receive projecting ends of pin 36 slidably therein. An upstanding spring seat 42 is struck out from the base of the retainer frame adjacent the outer end. The spring seat has an opening 44 formed therein. The flat, flexible hinge 24 is secured adjacent the inner end of the retainer frame 20 between the base and a clamping plate 48 in any suitable manner as, for example, by a pair of longitudinally spaced rivets 50 as shown. The spring retainer frame 20 is positioned with its upstanding ears 38 straddling the ears 32 of the mounting head section 28; the projecting ends of the transverse pin 36 are received in the arcuate slots 40. The flexible hinge 24 spans the joint between the mounting head section 18 and the retainer frame 20; it is secured to the lower surface of the mounting head section between a pressure plate 52 and a stabilizer 54 by any suitable means as, for example, rivets 56 as shown. The rivets 56 are threadably received in the mounting head section and have extending rivet heads. It should of course be understood that in accordance with the broader aspects of this invention, any suitable securing means as, for example, screws, may be employed to retain the hinge 24 and stabilizer 54 in position on the mounting head section 18.

The clamping plate 48 has an offset end portion 48a which forms a slot 49 between the upper surface of the flexible hinge 24 and the offset portion 48a. The stabilizer 54 in its assembled position overlies the hinge 24 and extends from the mounting head section 18 to the spring retainer frame 20. A rounded edge 54a of the stabilizer is retained in the slot 49 and is free to rotate therein. The stabilizer provides torsional resistance at the hinge point.

Spring assembly 26 comprises a spring guide 58 having an enlarged end portion 60 which pivotally engages pin 36 intermediate ears 32. A spring seating ring 64 abuts end portion 60. Received on the spring guide 58 is a cylindrical sleeve 65 of any suitable material, as for example, plastic or metal. Received on the sleeve is a helical compression spring 66. The outer end of the spring guide 58 is slidably carried in opening 44 of spring seat 42. Thus, the spring 66 is retained in compression seating ring 64 and spring seat 42.

The blade carrying outer arm extension 22 is U-shaped in cross section; it straddles and encloses the spring retainer frame 20 in assembled position. A pair of tabs 70 and a pair of tabs 72 extend from the legs of arm extension 22 and are bent over in notches 74 and between rivets 50, respectively, on the lower surface of retainer 20 to secure the arm extension 22 to the frame 20. At the outer end of blade carrying arm extension 22 is provided a blade attachment means of any suitable type. As illustrated, a pair of ears 76 having a pair of pin receiving aligned openings 78 is provided for attaching to a transversely extending opening in a wiper blade superstructure. With this construction, no rivets, screw heads or other protuberances show on a visible surface of the wiper arm. This provides a smooth, sleek wiper arm with an uninterrupted surface which can blend readily with the windshield molding.

In operation, the outer arm assembly, including frame 20 and blade carrying arm extension 22, pivot relative to the mounting head 30 at hinge 24 in following the contour of the windshield. The ends of pin 36 ride in arcuate openings 40; excessive pivotal movement is prevented since the ends of transverse pin 36 cooperate with the ends of arcuate slots 40 to limit pivotal movement. If, in accordance with the broader aspects of the invention, it is desired to omit the stabilizer 54, the engagement of pin 36 with side walls of slots 40 would offer resistance to twisting at the hinge 24. As the arm pivots, spring guide 58 slides back and forth in openings 44 of spring seat 42. The spring 66 compresses and expands between spring seating ring 64 and spring seat 44, providing the necessary biasing force to urge the blade against the windshield. During relative pivotal movement between the mounting head section 30 and arm extension 22, the stabilizer rolls on edge 54a within slot 49.

An improved low profile wiper arm assembly has been provided which includes a smooth, uninterrupted, sleek, visible surface readily adaptable to blend with the trim moldings of a motor vehicle and of small enough size to be concealed in a small compartment in the parked position. The low profile arm reduces interference with the operator's vision in addition to providing improved appearance. A certain specific embodiment of the invention has been described for the purpose of illustration, but it will be apparent that various modifications and other embodiments are possible within the scope of the invention. For example, other and different types of arm mounting means and blade mounting means may be employed in accordance with the broader aspects of the invention. It is to be understood, therefore, that the invention is not limited to the specific arrangement shown, but in its broadest aspects it includes all equivalent embodiments and modifications which come within the scope of the invention.

What is claimed is:

1. A low profile windshield wiper arm for motor vehicles comprising a mounting head section, a retainer frame, an outer blade carrying arm extension secured to said retainer frame, flexible hinge means for securing said mounting head section to said retainer frame and biasing means acting between said mounting head section and said retainer frame for applying wiping pressure to a windshield wiper blade.

2. A windshield wiper arm according to claim 1 wherein stop means are provided for preventing excessive pivotal movement about said flexible hinge means.

3. A windshield wiper arm according to claim 1 wherein said biasing means comprises a compression spring assembly, said mounting head includes a first spring seat, said retainer frame includes a second spring seat, said compression spring acting between said first and second spring assembly seats.

4. A windshield wiper arm according to claim 1 wherein a stabilizer overlies said flexible hinge means and extends from said mounting head section to said retainer frame, said stabilizer being rigidly fixed at one end and rotatable about an edge at its other end whereby twisting due to torsional forces is resisted.

5. A low profile windshield wiper arm for motor vehicles comprising a mounting head section, a retainer frame, an outer arm blade carrying section secured to said retainer frame, flat, flexible hinge means for securing said mounting head section to said retainer frame, stabilizer means overlying said flat, flexible hinge means, biasing means comprising compression spring means acting between said mounting head section and said retainer frame for applying pressure to a windshield wiper blade, and stop means for preventing excessive pivotal movement about said flat, flexible hinge.

6. A combination according to claim 5 wherein said stabilizer comprises a plate fixed to said mounting head section in overlying juxtaposition with said flexible hinge and extending to said retainer frame, said plate being rounded at its edge adjacent said retainer frame, said rounded edge being received in slot means at said retainer frame and rotatable therein.

7. A combination according to claim 5 wherein said stop means comprises a stop pin extending transversely through said mounting head section and having its end portions engaging aligned arcuate slots in said retainer frame.

8. A combination according to claim 7 wherein said compression spring means comprises a spring guide pivotally engageable with said stop pin and a compression spring retained thereon.

References Cited

UNITED STATES PATENTS

| | | | |
|---|---|---|---|
| 2,576,077 | 11/1951 | Ozarowski | 15—250.34 XR |
| 2,326,402 | 8/1943 | Smulski | 15—250.34 |
| 3,176,336 | 4/1965 | Scinta | 15—250.35 |

FOREIGN PATENTS

| | | |
|---|---|---|
| 1,078,461 | 3/1960 | Germany. |
| 433,731 | 8/1935 | Great Britain. |

PETER FELDMAN, *Primary Examiner.*

U.S. Cl. X.R.

15—250.34